(No Model.)
J. P. HANSON.
DEVICE FOR TIGHTENING AND GUIDING BELTS.
No. 307,114. Patented Oct. 28, 1884.
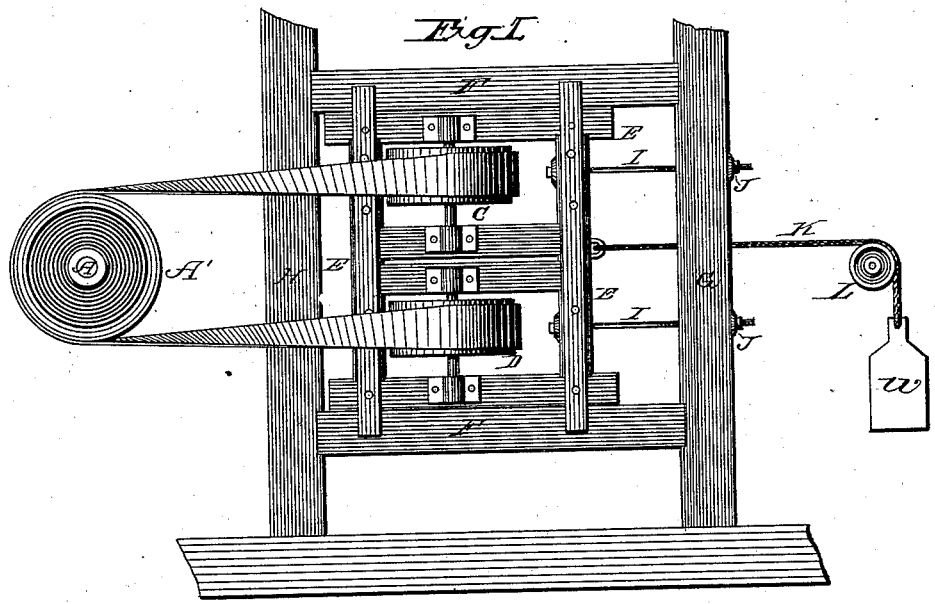
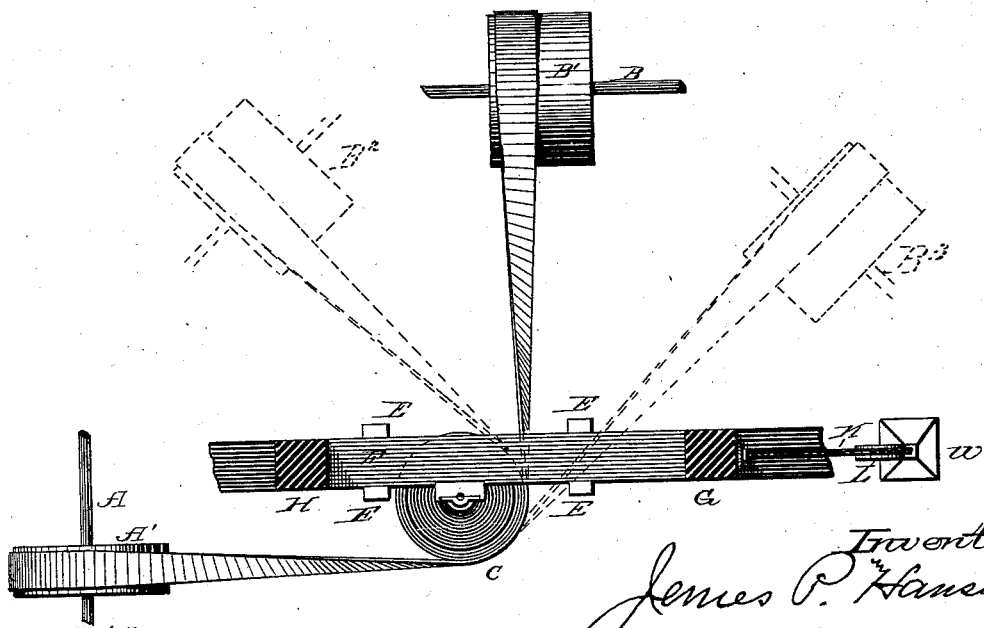

UNITED STATES PATENT OFFICE.

JEMES P. HANSON, OF OSHKOSH, WISCONSIN.

DEVICE FOR TIGHTENING AND GUIDING BELTS.

SPECIFICATION forming part of Letters Patent No. 307,114, dated October 28, 1884.

Application filed June 5, 1884. (No model.)

*To all whom it may concern:*

Be it known that I, JEMES P. HANSON, a citizen of the United States, residing at Oshkosh, in the county of Winnebago and State of Wisconsin, have invented certain new and useful Improvements in Devices for Tightening and Guiding Belts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to devices for tightening and guiding belts on machinery where power is transmitted by a belt from a pulley on one shaft to a pulley on a second shaft, which second shaft is at an angle to the first shaft.

The nature of my invention is hereinafter fully described and claimed.

In the accompanying drawings, Figure 1 is a side view showing a cross-section of one shaft and its pulley, and a portion of the belt and my tightening and guiding device in position in connection therewith, with sufficient of the supporting-frame to show its method of operation. Fig. 2 is a top view of the same mechanism, and also of the second shaft and pulley.

Like letters refer to the same parts in both views.

In the drawings, A is a shaft having a rigid pulley, A', thereon. B is a second shaft, and B' is a rigid pulley thereon, the face of which pulley B' is, for purposes hereinafter described, made considerably wider than the belt running thereon.

In the drawings, the shaft B is placed at right angles to the shaft A; but my device operates equally well when these shafts are placed at any other angle to each other—as, for example, when the second shaft is placed in either of the positions, B² B³, indicated by dotted lines in Fig. 2. Either shaft may be the driving or driven shaft, the other shaft, connected by belt therewith, being, of course, its complement, either driven or driving.

C and D are idle-wheels, the axles of which have their bearings in the movable frame E. These idle-wheels are each independent of the other, as they are required to rotate in opposite directions, and are set at such distance apart and in such position as that they are in the plane of belt-motion from the periphery of one pulley to the periphery of the other pulley, and have their axes either vertical, or, when the pulleys A' and B' are located one higher than the other, at such inclination that the axes of said idle-wheels will be at right angles to the line of motion of the belt passing over the face of such wheel. The frame E is supported and has a sliding motion upon and guided by the cross-bars F F, which cross-bars are rigidly affixed to the upright posts G and H, or other equivalent supports. The frame E is adjustably attached to the post G by the rods I I, which rods pass movably through post G, and are provided at one end with a screw-thread and nuts, J J, whereby by tightening said nuts J J said frame E may be drawn toward the post G, or, by loosening said nuts, said frame is permitted to be drawn away from said post G. Instead of said rods I I, or, in connection therewith, I provide the weight W, which weight, being attached to the front end of the frame E by a cord, and the attaching-cord K being passed over the pulley L, serves to draw the frame E toward the post G. The shaft of one pulley being placed at an angle to the shaft of the other pulley, as indicated in Fig. 2 by B, or B², or B³, with reference to the shaft A, and the idle-wheels C and D being placed with reference to said shafts and their pulleys, as hereinbefore indicated, it is obvious that the belt connecting and running over said pulleys A' and B' and running upon the peripheries of the wheels C and D, having the bearings of their axes in the movable frame E, may be readily adjustably tightened by screwing up the nuts J J on rods I I, and will be automatically tightened by the gravity of the weight W acting upon the frame E to draw it toward the post G, as shown in Figs. 1 and 2, and said belt will at the same time be guided by said idle-wheels being in the positions aforesaid, so that it will run truly and in line upon the peripheries of said pulleys A' and B', said pulley B' having a wide face, as before stated, so that if by the stretching of the belt the frame E is permitted to move somewhat toward the right, as shown in Fig. 2, the belt will run by so much to the right on the periphery of the pulley B'. Both pulleys A' and B' should be provided with wide faces if it is desired to place the idle-wheels C and D at such an angle to both pulleys (as may be done) as that when said idle-wheels are forced ahead by the weight or adjusting-nuts said idle-wheels will be carried away from both pulleys.

What I claim as new, and desire to secure by Letters Patent, is—

1. In mechanism for transmitting power by a belt from one shaft to another when the second shaft is placed at an angle to the first shaft, the shafts A and B, pulleys A' and B', (one or both, said pulleys being provided with an extra-wide straight face,) and the belt running on both pulleys, in combination with the idle-wheels C and D, having their bearings in a movable frame, E, which frame is supported upon a suitable rigid frame, said pulleys being held firmly against the belt by the rods I and nuts J, or by the weight W, attached to the frame E, or other equivalent means, substantially as set forth.

2. In mechanism for transmitting power by a belt from one shaft to another shaft when the second shaft is placed at an angle to the first shaft, the intermediate idle-wheels, C and D, having their bearings in a movable frame, E, frame E, supported by and movable with a sliding motion upon a rigid supporting-frame having rigid cross-bars F F, and rods I I, having thread and nuts J J, in combination with the shafts A and B and their connecting-belt, substantially as set forth.

3. In mechanism for transmitting power by a belt from one shaft to another shaft when the second shaft is placed at an angle to the first shaft, the intermediate idle-wheels, C and D, having their bearings in a movable frame, E, frame E, supported by and having a sliding movement upon the rigid cross-bars F F, of a rigid supporting-frame, and the weight W, attached to the front end of frame E by cord K, which cord K passes over pulley L, in combination with pulleys A' and B' on shafts A and B, and their connecting-belt, substantially as and for the purpose set forth.

In testimony whereof I affix my signature in presence of two witnesses.

JEMES P. HANSON.

Witnesses:
H. B. HARSHAW,
O. C. WEISBROD.